US009223561B2

(12) United States Patent
Orveillon et al.

(10) Patent No.: US 9,223,561 B2
(45) Date of Patent: Dec. 29, 2015

(54) METHOD FOR PROVIDING AN ON-DEMAND SOFTWARE EXECUTION SERVICE

(75) Inventors: Laurent Orveillon, Tregastel (FR); Armand Vandenbussche, Lannion (FR)

(73) Assignee: Orange, Paris (FR)

( * ) Notice: Subject to any disclaimer, the term of this patent is extended or adjusted under 35 U.S.C. 154(b) by 166 days.

(21) Appl. No.: 13/533,092

(22) Filed: Jun. 26, 2012

(65) Prior Publication Data

US 2012/0331463 A1 Dec. 27, 2012

(30) Foreign Application Priority Data

Jun. 27, 2011 (FR) ...................................... 11 55672

(51) Int. Cl.
G06F 9/455 (2006.01)
G06F 9/445 (2006.01)
G06F 9/50 (2006.01)

(52) U.S. Cl.
CPC .............. *G06F 8/63* (2013.01); *G06F 9/45533* (2013.01); *G06F 9/505* (2013.01); *G06F 2009/4557* (2013.01); *G06F 2009/45562* (2013.01)

(58) Field of Classification Search
CPC ................................. G06F 9/4558; G06F 8/63
USPC .................................................... 718/104, 1
See application file for complete search history.

(56) References Cited

U.S. PATENT DOCUMENTS

| 8,301,686 | B1 * | 10/2012 | Appajodu et al. ............. 709/201 |
| 2006/0259896 | A1 * | 11/2006 | Hanson et al. ................. 717/118 |
| 2008/0104608 | A1 | 5/2008 | Hyser et al. |
| 2008/0184225 | A1 * | 7/2008 | Fitzgerald et al. ................. 718/1 |
| 2010/0228819 | A1 | 9/2010 | Wei |
| 2010/0332657 | A1 * | 12/2010 | Elyashev et al. .............. 709/226 |
| 2010/0332889 | A1 * | 12/2010 | Shneorson et al. ............... 714/2 |
| 2011/0106949 | A1 | 5/2011 | Patel et al. |
| 2011/0154318 | A1 * | 6/2011 | Oshins et al. ..................... 718/1 |
| 2011/0179414 | A1 * | 7/2011 | Goggin et al. .................... 718/1 |
| 2012/0167081 | A1 * | 6/2012 | Sedayao et al. ................... 718/1 |
| 2013/0275973 | A1 * | 10/2013 | Greenfield et al. ............... 718/1 |
| 2014/0019970 | A1 * | 1/2014 | Okamoto .......................... 718/1 |

FOREIGN PATENT DOCUMENTS

| EP | 2 075 694 A1 | 7/2009 |
| FR | 2 885 429 A1 | 11/2006 |

OTHER PUBLICATIONS

C. P. Sapuntzakis, R. Chandra, B. Pfaff, J. Chow, M. S. Lam, and M. Rosenblum. Optimizing the Migration of Virtual Computers. In Proceedings of the 5th Symposium on Operating Systems Design and Implementation (OSDI 2002), ACM Operating Systems Review, Winter 2002 Special Issue, pp. 377-390, Boston, MA, USA, Dec. 2002.*

* cited by examiner

*Primary Examiner* — Van Nguyen
*Assistant Examiner* — Jacob Dascomb
(74) *Attorney, Agent, or Firm* — Drinker Biddle & Reath LLP (57) ABSTRACT

A method for providing an on-demand software execution service has the following steps: receiving from at least one terminal, at least one request for executing at least one software package, by a virtual machine launched on a virtual machine launching server from files from a set of files for launching virtual machines, and selecting from a set of servers at least one server to which the request will be directed, according to a rule for distributing the execution load of virtual machines by servers of the set of servers.

14 Claims, 4 Drawing Sheets

METHOD FOR PROVIDING AN ON-DEMAND SOFTWARE EXECUTION SERVICE

CROSS-REFERENCE TO RELATED APPLICATIONS

This application claims the benefit of French Application No. 1155672 filed Jun. 27, 2011, the entire content of which is incorporated herein by reference.

FIELD

The present invention relates to the field of software as a service, also known under the acronym of SaaS (acronym of <<Software as a Service>>).

BACKGROUND

As regards providing on-demand software, it is possible to use the so-called <<virtualization>> technique.

Virtualization is a technique allowing an operating system and applications (for example software packages) to be performed on a virtual machine. According to this technique, the operating system and the applications do not have directly access to the hardware peripherals of the physical machine which applies them.

Virtualized applications have access to hardware peripherals via a <<hypervisor>>. The hypervisor is a program which has the function of emulating peripherals for virtual machines by using the hardware peripherals actually present on the physical machine.

Virtualization may be used for providing remote execution of software packages in machines of a computer network. These services are known as "cloud computing".

Figure 1:
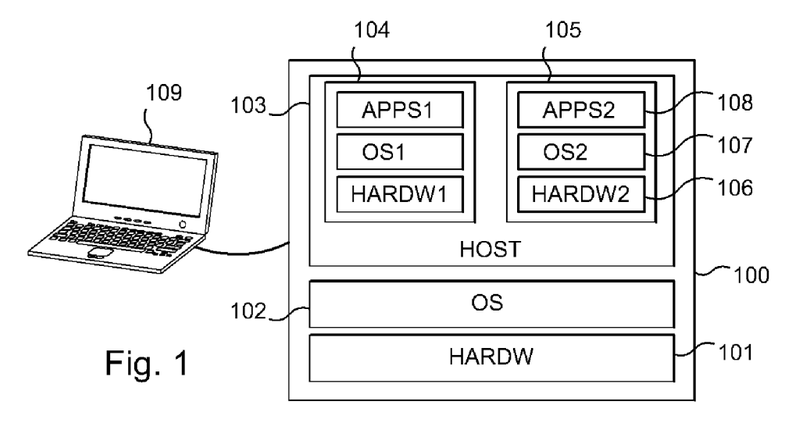

FIG. 1 illustrates the software and hardware structure of a virtualization server 100, i.e. a server applying virtual machines.

The server includes a set of peripherals 101 (HARDW) used for its operation such as for example one or several processors, RAM units, storage units (hard disks for example), communication units or any other piece of hardware. The server runs under the control of an operating system 102 (OS) which manages the use of the peripherals by the server and the execution of a hypervisor module 103 (HOST). The hypervisor module makes up the interface between virtual machines 104, 105 and actual peripherals 101 of the server. Two virtual machines are illustrated in FIG. 1, but the execution of another number of virtual machines may be contemplated.

Each virtual machine 104 and 105 allows access to be given to a user terminal 109 (or several terminals) connected to the server 100, to emulated peripherals 106 (HARW1, HARDW2), to an operating system 107 (OS1, OS2) and applications 108 (APPS1, APPS2) as if they were present on the actual terminal 109.

Virtual machines allow on-demand software services to be proposed. According to these services, a user may apply software packages which are executed by the servers of an operator network. It is then no longer necessary that the user have a performing machine, specifically adapted to the use of a software package, nor that he be concerned with installing the software package on his/her terminal. For example, the user may both have access to games which require high performances as regards hardware and to less demanding desktop applications.

According to such services, a user has a terminal (personal computer, Set Top Box, a touch pad or other system) connected to the network of an operator providing an on-demand software providing service and sends a request for use of a given software package.

A server of the network receives this request and then starts a virtual machine for this user thus making the requested software package available on the terminal of the user via a broadcasting protocol (such as for example VNC, acronym of <<Virtual Network Computing>>, MpeG2, or other protocol).

Upon closing the application, a command is sent by the user and the virtual machine is stopped and the context of the user may be deleted.

At each instant, a virtual machine may be represented by a set of data representing:
 the operating system of the virtual machine,
 the software packages applied in this operating system,
 the state of the virtual machine, i.e. the state of the peripherals simulated by the virtual machine (hard disk, mouse or other peripheral), and
 the context of use of the virtual machine, i.e. the data from the execution of an application (temporary files for example).

In order to launch a virtual machine and put a software package at the disposal of a user, it is then sufficient to assemble the data corresponding to the desired software package, to the associated operating system, to the peripherals required for executing the software package and to the context of use of the user.

With the presently proposed architectures of virtual machines, it is necessary to generate as many sets of data (operating system, software package, state of the machine, user context) as there are simultaneous users.

This poses problems for loading the virtualization server, especially when it is desired to provide the on-demand software package service on a large scale.

Indeed, it is difficult to select a fixed number of servers beforehand in order to deal with the requests from the users, given that this demand may strongly change depending on a large number of parameters such as for example the success of a software package in particular, the period of the day or another parameter.

SUMMARY

Therefore there exists a need for facilitating the providing of an on-demand software package service on a large scale which allows fast and efficient adaptation to the needs of the users.

For this purpose, according to a first aspect of the invention, a method for providing an on-demand software execution service is proposed, including the following steps:
 receiving from at least one terminal, at least one request for having at least one software package be executed by a virtual machine launched on a virtual machine launching server, from files of a set of files for launching virtual machines, and
 selecting, from a set of virtual machine launching servers, at least one server to which the request will be directed, according to a rule for distributing the execution load of virtual machines by servers of said set of servers.

The invention proposes taking advantage of the representation of virtual machines in several sets of data corresponding to the operating system, to the software packages and to the state of the machine on the one hand, and of techniques for distributing files on the other hand.

For this purpose, the data representing virtual machines are grouped as files (so called <<image files>>) which may be managed and shared.

These files are then distributed in a network of files according to rules for distributing the load among the servers.

The image files allow subdivision of the representation of the virtual machine according to several image files, at least three of which correspond to the operating system, to the applications and to the state of the machine, respectively. Execution of a virtual machine may then be performed by concatenation of these three files. The execution may also be accomplished by concatenating more than three files, for example in the case of launching several software packages under the same operating system.

The memory space of the server applying a set of virtual machines may then be optimized, in order to provide them for use.

The use of image files for launching virtual machines allows reduction in the period of time which will elapse between the request for access to a software package by a user and its use, and minimization of the memory space of the physical server used by all the virtual machines generated by several simultaneous users.

The launching of the software package desired by the user is then accomplished by simply reading files which are already available.

To deal with the time-dependent change in the demand from the users, the image files are distributed so as to take into account the load of the servers which apply the virtual machines and the requests for executing software packages are redirected according to the time-dependent change in this distribution.

This then allows the fast on-demand software execution service to be applied for the users (since the virtual machines are launched rapidly by using the image files) and flexible to apply for the operator of the service (since he/she may optimize the number of servers to be deployed).

The server may be selected because it stores at least one file from the set of files for executing said at least one software package.

Alternatively, the method may further include a step for requesting storage at said at least one selected server, of said at least one file from the set of files for executing said at least one software package.

Thus, the catalogue of software packages available at each virtualization server may then be adapted in real time.

The method may further include a step for determining a level of use of the file by virtual machines and the request for storage may then be carried out when the level of use is above a threshold.

Determination of the level of use may thus give information on the popularity of an image file of a software package, of an operating system or other system and distribute the most popular files.

Thus, according to embodiments, the image files which are the most shared by the virtual machines may be distributed in replication servers close to the user terminals.

In an embodiment, the method further includes the following steps:
    determining an execution load for virtual machines of a first server storing said at least one file for executing said at least one software package,
    selecting the first server if the determined load meets a loading criterion, and if the determined load does not meet the loading criterion,
    requesting storage of said at least one file at a second server and selecting this second server for executing said at least one software package.

According to this embodiment, it is thus possible to unload a server which is already executing a large number of virtual machines in order to avoid its saturation and thereby allow virtual machines to be executed for new users without any risk of compromising the service quality for the users already connected to the first server.

The request for storage may for example be a request for displacing said at least one file for executing said at least one software package, from the first server towards the second server.

Thus, all the new requests regarding the software package may be directly redirected towards the second server, thereby relieving the first server from executing the virtual machines, in order to execute this software package.

Alternatively, said at least one file for executing said at least one software package may be copied out from the first server towards the second server.

Thus, the requests regarding the software package may be redirected towards either server for example according to a rule of geographic proximity of the server relatively to the user.

According to an embodiment, the method further includes the following steps:
    determining a number of instances of execution of a same software package on a third server from a set of terminals localized in a same geographic area,
    comparing this number of instances of execution to a threshold, and
if this number of instances is above this threshold:
    transferring the execution of the instances to a fourth server which is found at greater geographic proximity to said same geographic area than the third server, and
    selecting the fourth server for transferring the requests for executing the same software package from terminals localized in the geographic area. In embodiments, the distribution rule takes into account the available bandwidth for the servers storing the files for executing the software package.

Thus, it is further possible to take into account the number of virtual machines launched by a server, the accessibility of this server considering the volume of data exchanged by this server. It is then possible to avoid directing requests to a server, for which the communications are saturated.

In an embodiment, the method further includes at least one step for analyzing the level of the request for executing the software package by several terminals and the server is selected according to this request level.

Thus it is possible to group the requests concerning the software package and to direct them to a same server in order to mutualize the resources which are useful for executing this software package.

The execution request level may be relative to a number of requests for executing a same software package, to a sharing level of a same image file (relative to a software package, an operating system or other system), to a geographic area in which the server is found, to a time slot or other interval. It may be determined by counting the requests for executing software packages or by statistically analyzing these requests in order to determine places at which a software package is in most great demand, at what time, etc.

In embodiments, the set of files includes:
    a first subset including at least one first file representing a first state of a virtual machine after installing an operating system from this machine, a second subset including at least one second file representing a second operation for bringing the virtual machine from the first state to a second state in which a software package is installed on the machine, and a third subset including at least one third file representing a third state of the machine after launching the software package on the machine.

Further, for executing said at least one software package by launching a virtual machine, at least three files from each of the first, second and third subsets are selected, these at least three files corresponding to said at least one software package and to an operating system which is associated with it.

The use of these files for representing and launching a virtual machine provides launching rapidity and the possibility of sharing common files among several virtual machines (for example the common operating system files, common software files or other files).

A second aspect of the invention relates to a computer program as well as to computer program product and to a storage medium for such program and product, allowing the application of a method according to the first aspect of the invention, when the program is stored in a memory of a control server and executed by a processor of such a server.

A third aspect of the invention relates to a control server configured for applying a method according to the first aspect of the invention.

Such a server for controlling a method for providing an on-demand software execution service includes:

a communication unit configured for receiving from at least one terminal, at least one request for executing at least one software package by a virtual machine launched on a virtual machine launching server from files of a set of files for launching virtual machines; and a processing unit configured for selecting, from a set of virtual machine launching servers, at least one server to which the request will be directed, said at least one server being selected according to a rule for distributing the execution load of virtual machines by the servers of the set of servers.

A fourth aspect of the invention relates to a system configured for applying a method according to the first aspect of the invention.

Such a system for providing an on-demand software execution service includes:

a control server according to the third aspect of the invention, and at least one virtual machine launching server configured for launching virtual machines from files of a set of files for launching virtual machines.

The objects according to the second, third and fourth aspects of the invention provide at least the same advantages as those provided by the method according to the first aspect. The objects according to the third and fourth aspects may include means for applying optional characteristics mentioned for the first aspect in terms of method.

BRIEF DESCRIPTION OF THE DRAWINGS

Other features and advantages of the invention will become apparent upon reading the present detailed description which follows, as a non-limiting example, and the appended figures wherein, in addition to FIG. 1.

DETAILED DESCRIPTION

In the following description, the virtual machines are launched from at least four image files respectively representing an operating system, at least one software package, the state of the peripherals of the virtual machine and the user context of the virtual machine. The first three image files are read-only, only the user context file is generated on-demand. The time for starting the virtual machines is then optimized and the memory space of the server is optimized.

For the sake of clarity of the discussion, it is assumed that an operator of an on-demand software providing service proposes a catalogue of software packages all operating with the same operating system. The servers applying the virtual machines each have the image file of the operating system and share it on all the virtual machines which they execute.

In the case of an operator proposing software packages running under several operating systems, image files of these operating systems would be distributed according to the same principles as those described hereafter for the image files of the software packages.

Figure 2A:
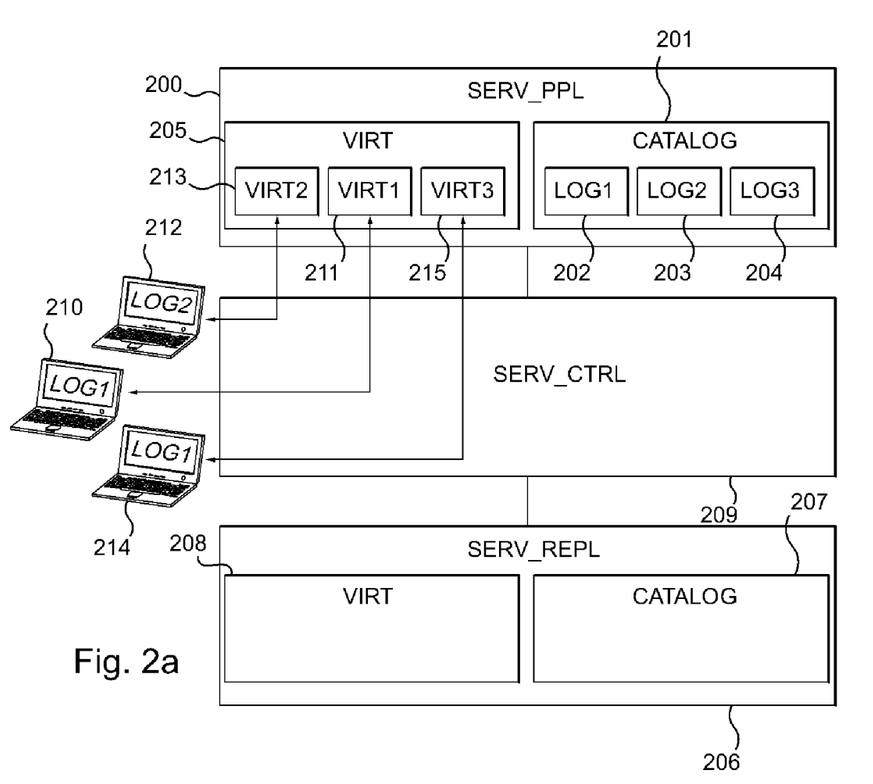
FIGS. 2a and 2b illustrate an example of a general context for applying an embodiment of the invention.

FIG. 2a illustrates a context for applying embodiments of the invention.

The server 200 (SERV_PPL) is a main virtualization server. It includes a unit 201 (CATALOG) for storing a catalogue of software packages available for user terminals (for example personal computers, Set Top Boxes, touch pads or other hardware). The server 200 includes a storage unit 201 for storing image files 202 (LOG1), 203 (LOG2) and 204 (LOG3) associated with available software packages. The catalogue may contain a totally different number of image files depending on the number of available software packages. The server 200 also includes a virtual machine launching module 205 (VIRT) allowing the launching of virtual machines for executing the software packages of the catalogue.

The server 206 (SERV_REPL) is a replication server, the structure of which is similar to that of the server 200. The server 206 includes a storage unit 207 (CATALOG) for a catalogue of software packages and a virtual machine launching module 208 (VIRT). The replication server is used for displacing or copying out image files from the main server for example in order to unload it or bring execution of virtual machines closer to the user terminals as this is described subsequently.

The number of replication servers and of main servers is limited here for the sake of brevity.

The servers 200 and 206 are managed by a control server 209 (SERV_CTRL), the role of which is detailed subsequently.

In the context of FIG. 2a, a user terminal 210 makes a request for launching a software package provided by the operator of the on-demand software providing service. This software package is associated with the image file 202 stored at the server 200 in the storage unit 207.

The request is intercepted by the control server 209 which determines the server towards which the request will be directed according to criteria for distributing the load between the main server 200 and the replication server 206.

It is assumed that the main server 200 may launch in parallel, at most three virtual machines. This number is purely illustrative and may be different depending on the performances of the server. As no virtual machine has yet been launched, it may satisfy the request. The latter is therefore directed towards this server and a virtual machine 211 is launched within the virtualization model 211 by accessing the image file 202 corresponding to the software package requested by the terminal 210.

Still in the context of FIG. 2a, a terminal 212 makes a request for launching the software package associated with the image file 203. The request is intercepted by the control server 209 which determines the server to which the request will be directed. The maximum number of virtual machines which the server 200 may execute simultaneously not having been reached yet, the control server directs the request towards the main server 200. Upon receiving the request, the server 200 launches a new virtual machine 213 (VIRT2) in the virtualization module 205 by accessing the image file 203 corresponding to the software package requested by the terminal 212.

Moreover, still in the same context, a terminal 214 makes a request for launching the software package associated with the image file 202. The request is intercepted by the control server 209 which determines the server to which the request will be directed. The main server 200 has already launched two virtual machines 211 and 213. This number of virtual machines launched simultaneously being less than the maximum threshold of three simultaneous machines, the server 200 may therefore launch a new virtual machine. A new virtual machine 215 (VIRT3) is then launched in the virtualization module 205 by accessing the image file 202 corresponding to the software package requested by the terminal 214.

At this stage, the main server 200 has reached its maximum capacity for simultaneously launching virtual machines. The control server therefore applies a distribution of the load between the main server and the replication server. The application of the replication server is described with reference to FIG. 2b which again takes up the elements of FIG. 2a with the same reference marks.

Figure 2B:
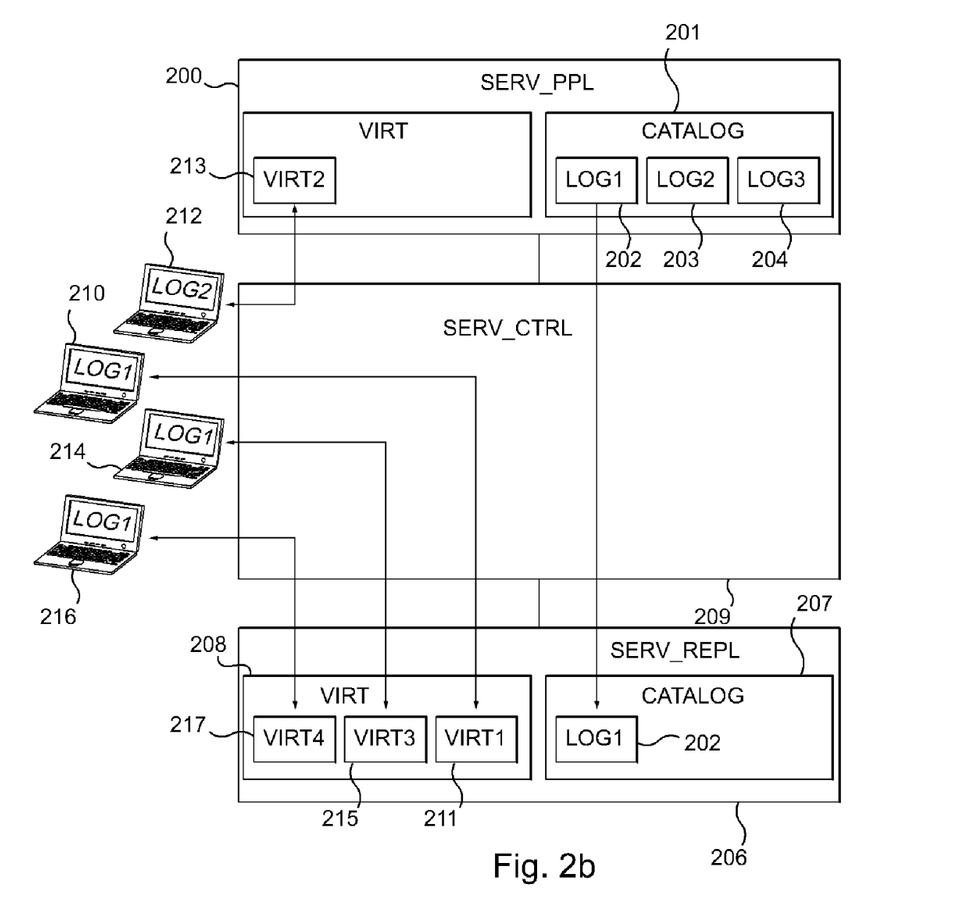

In the context of FIG. 2b, a new terminal 216 makes a request for launching the software package associated with the image file 202. The control server intercepts the request. As the main server has reached its maximum load, a distribution of the load is performed among the servers 200 and 206.

In order to unload the main server, the image file 202 is copied out into the storage unit 207 of the server 206 so as to allow the server 206 to launch virtual machines executing the associated software package in its virtualization module 208. Alternatively, the file 202 may be displaced, i.e. a copy of the file would not be kept within the main module.

Next, the request of the terminal 216 is directed towards the replication server 206 and upon receiving the request, the latter launches a virtual machine 217 (VIRT4) in the virtualization module 208 by accessing the image file 202 having been copied beforehand.

In order to further relieve the load on the server 200, it is possible to optionally provide displacement of the execution of the virtual machines 215 and 213, (which also use the image file 202) towards the server 206. This option may notably be selected when the file 202 is not copied but completely displaced from the server 200 to the server 206.

The displacement of the execution of the virtual machines is facilitated by the use of image files since it is then sufficient to copy the image files relating to the state of the machine and to the context of use (and optionally the image file relating to the operating system).

In the example of FIGS. 2a and 2b, redirection of the request towards the replication server is decided when the main server reaches its maximum capacity for simultaneous execution of virtual machines.

Alternatively, or as a combination, this redirection may be decided relatively to the localization of the users and to the localization of the replication server(s).

For example it is assumed that the terminals 210, 214 and 216 are located in a same geographic area and that the main server 200 is at a distance away from this geographic area while the replication server is close to it. When the number of requests from this geographic area becomes significant, it may be decided to redirect the requests towards the replication server since it is closer to the terminals from which the requests are issued. It may further be decided to transfer the current execution of virtual machines for terminals of this area towards the replication server.

According to another alternative, or combination, redirection is decided when the occupation of the bandwidth of the main server reaches a threshold. In order to avoid saturation of the server with requests, it may be decided to redirect the requests to the replication server, which itself may have a less occupied bandwidth.

In what has just been described, the control server optimizes the load of the servers as a response to the intercepted request. It may however also be envisioned to organize the load distribution in a proactive way, before noticing for example that the maximum load has been attained on the main server, by applying a predefined distribution policy.

For example, this distribution policy may apply rules based on the use of the bandwidth available for the virtualization servers, according to geographic criteria or other criteria.

It is also possible to envision redirections of requests according to an audience criterion (or popularity criterion) on a given software package. For example, when the control server determines that a software package subject to strong demand for execution (for example by statistical analysis of the received requests), decides to specialize a virtualization server in executing this software package and to direct all the requests for this software package towards this specialized server.

According to this example, the control server may apply an analysis of the level of requests for executing a software package, for example by monitoring the number of virtual machines presently applying this software package or by counting the number of requests requiring execution of this software package. When this number of virtual machines or this number of requests reaches a threshold, the control server may determine that the demand is high for the software package and that it may be more optimal for managing the network to group the virtual machines of the users requesting execution of this software package on dedicated servers or distribute copies of the image file associated with the software package to other replication servers.

The audience level may also depend on the time or on the day. For example, on weekends (Saturday and Sunday), most offices are closed. As persons working in the offices massively use text processing or spreadsheet software packages, the control server may distribute in a substantial way the image files relating to these software packages by copying these image files into a large number of servers. The same mechanism may be applied during customary working hours (from 8 am to 6 pm, for example) during which the persons working in the offices use these software packages. Thus, the corresponding image files are copied into replication servers in a more substantial way for the day, and then deleted in the evening.

The audience level may also depend on geographic areas. For example, in a residential area, the requested software packages may rather correspond to leisure software packages such as video games, media readers (video, music) or other software. Thus, in these areas, replication servers may be positioned so as to provide sharing of the image files relating to such software packages. Further, for example, in industrial areas, the requested software packages may rather correspond to scientific calculation software packages, three-dimensional modeling software packages or other software. Thus, replication servers may be positioned in these areas in order to provide sharing of the image files corresponding to these software packages.

Distribution of the image file from the main server to the replication server(s) may be decided before deciding to redirect a request.

For example, the control server may perform an evaluation of the level of use (or of popularity) of an image file, i.e. an evaluation of its sharing by virtual machines launched for executing software packages requested by users.

For example a sharing level (or level of use) may for example be defined for an image file such as the ratio of the number of copies of this file present at the main server and at replication servers over the number of virtual machines using one of these copies. When this sharing level is high, this means that a large number of virtual machines need this file in order to execute a software package. When this number becomes large, for example when it exceeds a given threshold, the control server may infer therefrom that this file is popular and may decide to distribute this file to other replication servers. The control server then requests the storage of a copy of the image file at a server not storing any image file so that once the file is copied, this server may manage requests from users.

Figure 3:
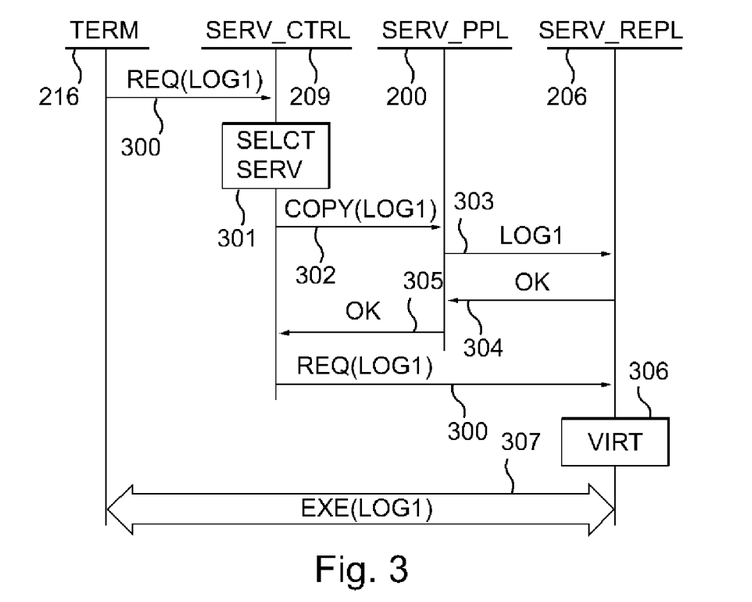
FIG. 3 is a diagram illustrating the steps applied in an embodiment.

FIG. 3 recapitulates the exchanges applied between the terminal 216, the main server 200, the control server 209 and the replication server 206.

In a first phase, a request 300 (REQ(LOG1)) for launching a software package is sent by the terminal 216 (TERM) and intercepted by the control server 209 (SERV_CTRL). The latter controls the request and during a step 301 (SELCT SERV) selects the server to which the request 300 will be directed. The question is to determine the optimal server for providing execution of the software package according to optimization criteria, for example distribution of the load on the servers 200 (SERV_PPL) and 206 (SERV_REPL).

When the control server selects a server which does not store the image file of the software package requested by the user terminal, it transmits to the main server 200 (which contains the catalogue of the image files of the available software packages) a copy (or displacement) request 302 (COPY(LOG1)) for the relevant image file at the selected server, in this case the replication server 206.

Upon receiving the copy request 302, the main server launches the copying of the image file towards the replication server with a message 303 (LOG1). The replication server then receives the message 303 and proceeds with copying the image file into the storage unit 207. Once the copying is completed, the replication server sends to the main server, a confirmation message 304 (OK). The main server then in turn sends a confirmation message 305 (OK) to the control server.

The control server then directs the request 300 to the replication server which, upon receiving the request, launches a virtual machine during step 306 (VIRT) in order to execute the requested software package. Application of the software package then continues during a step 307 (EXE(LOG1)) during which the replication server and the terminal exchange interface data.

Figure 4:
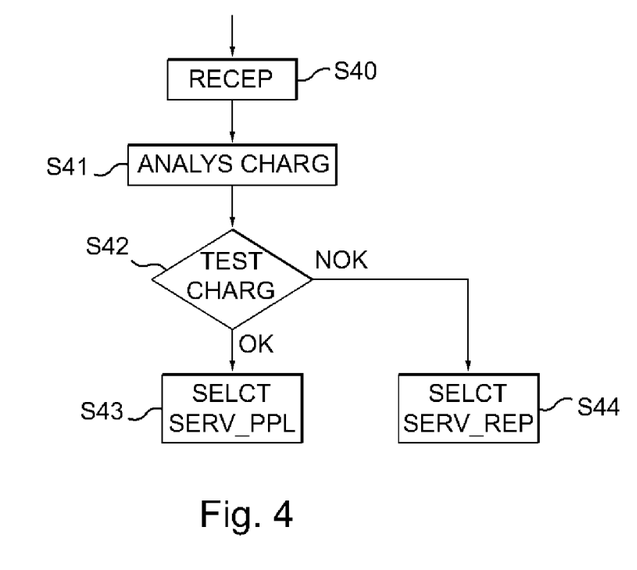
FIGS. 4 and 5 are flow charts of the steps applied for redirecting the software package execution requests according to embodiments.

FIG. 4 illustrates an embodiment according to which the requests for executing a software package are redirected according to a criterion on the execution load of the virtual machines.

During a step S40 (RECEP), the control server receives a request for launching a software package. Next, during a step S41 (ANALYS CHARG), the control server determines the load of one or several virtualization servers which may launch a virtual machine for executing the software package. The control server may check the capacity of a server by default, such as for example the main server. Alternatively, the control server may check the capacities of several virtualization servers, this check being carried out either by default or according to predefined criteria defining preferred servers.

After having determined the load on this (or these) server(s), the control server conducts a test during step S42 (TEST CHARG), during which it compares the load with a threshold for triggering redirection. In the example of FIGS. 2a and 2b, this threshold is equal to 3 for the main server since it cannot launch more than three virtual machines simultaneously.

If the test is satisfactory (OK), i.e. the load of the tested server is less than the threshold, the received request is directed towards the tested server during a step S43 (SELCT SERV_PPL). Otherwise (NOK), the request is redirected towards a server for which the load allows the request to be satisfied, during a step S44 (SELCT SERV_REP). This step S44 may include a storage request at the server, for an image file for executing the software package.

Figure 5:
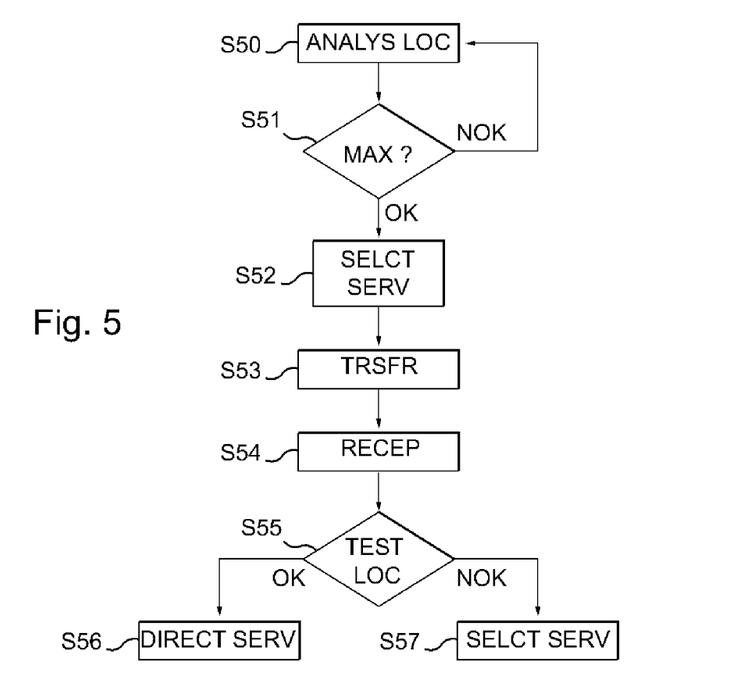

FIG. 5 illustrates an embodiment according to which the requests for executing a software package are redirected according to a geographic criterion.

A first step S50 consists of analyzing the origin of the received request and of determining for a given software package, the number of requests from a same geographic area. This step may be applied at regular time intervals by the control server or at each new request. It may also be triggered by the operator of the service according to cycles which he/she defines.

After this analysis step, during a step S51, it is determined whether a threshold of requests has been reached for a same software package and from a same area. This threshold for example corresponds to a number below which it is irrelevant for the operator to apply a new server for reasons of saving resources.

If this threshold is not reached (NOK), one returns to step S50. If this threshold is reached (OK), one proceeds to a step S52 (SELCT SERV) during which a server is selected for redirecting the request from this area. For example, a server located in this area is selected. One then proceeds to step S53 (TRSFR) during which the control server makes a request to the servers executing virtual machines for satisfying the requests from the geographic area, for transferring execution of the virtual machines to the selected server. This transfer is facilitated by using image files since it is sufficient for the relevant servers to exchange the image files, notably the user context file.

Next, upon receiving S54 (RECEP) new requests for executing the software package, the control server conducts a test S55 (TEST LOC) for localizing the origin of the request. If the request comes from the geographic area of the selected server (OK), it directs the request towards this server during a step S56 (DIRECT SERV). Otherwise (NOK), one proceeds to step S57 (SELCT SERV) for selecting another server for meeting the request.

In order to determine the origin of a request, the server may for example rely on a network address (such as an IP address of the Internet protocol) of the terminal making the request. Alternatively, or as a combination, each request is accompanied by an identifier of a geographic area in which the terminal is located.

Figure 6:
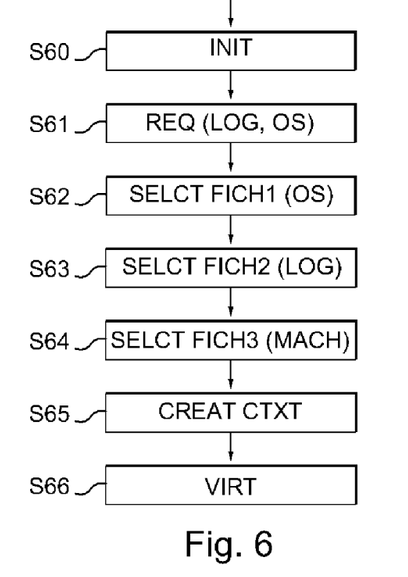
FIG. 6 is a flow chart of steps applied in an embodiment for launching a virtual machine, and FIG. 7 schematically illustrates a server according to an embodiment of the invention.

The launching of a virtual machine by the virtualization servers (main server or replication server) is described with reference to FIG. 6.

The launching of a virtual machine is based on the reading of image files, available at the server.

In a first initialization step S60 (INIT), first, second and third sets of files are made available to the server. These sets respectively include image files representing operating systems, software packages and states of virtual machines. For example, these files are stored at the server (in the storage units 201 and 207). The copying (or displacing) of an image file may be part of step S60.

Next, during a step S61 (REQ(LOG, OS)), the server receives a request for launching a given software package (LOG) operating under a given operating system (OS). For example, this request corresponds to the request 300 of FIG. 3.

Upon receiving the request, the server identifies the operating system and searches for a file corresponding to this operating system in the first set. It selects and then loads the corresponding file during step S62 (SELCT FICH1(OS)). In the example described with reference to FIGS. 2a and 2b, as it was considered that all the software packages run under the same operating system, this step amounts to loading the single file corresponding to the operating system under which all the software packages run.

Further, the server identifies the software package, and searches in the second set, for a file corresponding to this software package. In the example described with reference to FIGS. 2a and 2b, the second set corresponds to image files stored in the storage unit 201 and 207. It selects and then loads the corresponding file during step S63 (SELCT FICH2 (LOG)).

In the case when the user requests the launching of several software packages, the server selects several corresponding files from among the second set.

When the server has selected the files corresponding to the software package and to the operating system, it selects during step S64 (SELCT FICH3(MACH)) a file from among the third set.

In order to allow the user to apply the software package, the server generates during step S65 (CREAT CTXT) a context file associated with the user and with his/her request. This context file for example allows the link to be made between the virtual machine and the user.

The server may then launch a virtual machine during step S66 (VIRT) from the three selected files and from the generated context file. The launching may for example be accomplished by reading the files and by rebuilding the virtual machine represented by the concatenation of the three image files and of the context file. Once virtualization of the software package is completed, the user may apply the software package as if the latter was installed and started in his/her terminal. The software package is then available for the user for example via a broadcasting protocol such as VNC (<<Virtual Network Computing>>), or other protocol.

The user then has almost instantaneously a started software package reading to use.

The image files used for representing the virtual machines represent the progression of the configuration of the machine over time.

The image files are so called <<differential>> files, the use of which is made possible notably by the fact that a host application, such as a hypervisor may intercept all the instructions emitted by the virtual machine. Indeed, the hypervisor translates these instructions so that they may be executed by the peripherals, processor, hard disc, RAM memory, or other peripheral). Thus, it is possible to infer a minimum set of operations for bringing one machine from one state to another.

The use of differential files also gives the possibility of occupying less space than a file completely representing a virtual machine. Indeed, the files of the second set only include the operations required for changing states.

Sharing these image files on one or several servers also gives the possibility of saving storage space on these servers, since launching of several virtual machines may be accomplished by using a same shared image file, which thus avoids regeneration or copying of this same image file for each virtual machine.

Their generation is described in the following.

In a first phase, a virtual machine is started and an operating system is set up on this machine. Next, this machine is frozen by a command from the hypervisor (virtual peripherals are stopped, writing stopped in the image file) and the image of the machine is stored in a first image file which is placed as a read-only file. Thus, the file can no longer be modified and it may be used for starting virtual machines with the operating system already ready for use.

A new virtual machine is then started from the first file. This virtual machine then runs an operating system without any installed software. This image is then set to read-only.

A blank file is then generated (inheritance from the first file) and a software package is installed on the newly started virtual machine. The modifications then made to the virtual machine are then saved in the blank file (after freezing the virtual machine as earlier).

At this stage, a second file is available by which it is possible to switch from one state of the machine in which no software is installed to a state in which a software package is installed. The second file is then placed as a read only-file.

A new blank file is then generated, and the software is launched on the virtual machine. The machine is frozen just after starting the software package and the data relating to the state of the machine are then stored in the generated file.

At this stage, a third file is then available describing the virtual machine after launching the software package. The third file is then placed as a read-only file. Files 202, 203 and 204 are of this type.

When a virtual machine is launched for example by reading image files relating to an operating system, a software package and a machine state, the virtual machine is found in a frozen state in which the software package is launched and in which a set of virtual peripherals is in a predetermined state (for example the memory simulated by the virtual machine stores a certain number of data, the mouse simulated by the virtual machine points to a particular area of a screen, it also being simulated).

In order to allow the use of this virtual system by a user terminal, the elements simulated by the virtual machine are attached to actual physical elements. For example, a simulated mouse should be attached to a mouse actually present close to a user, a simulated screen should be attached to an actual screen. For this purpose, context image files are generated for each user of a launched virtual machine.

As mentioned earlier, it was considered in the example shown that all the software packages run under the same operating system. Consequently, the image file of this operating system is present at the main server and at the replication server.

A computer program for applying a method according to an embodiment of the invention may be produced from the diagrams of FIGS. 3 to 6 and from the present detailed description.

A control server according to an embodiment is described with reference to FIG. 7.

Figure 7:
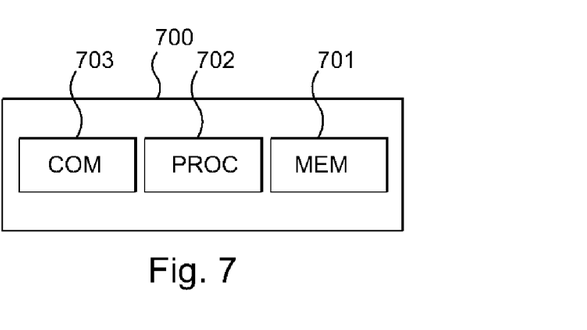

The application server 700 of FIG. 7 includes a memory unit 701 (MEM). This memory unit includes a RAM memory for storing in a non-permanent way calculation data used during the application of a method according to the invention, according to different embodiments. The memory unit moreover includes non-volatile memory (for example of the EEPROM type) for storing a computer program for example, according to an embodiment, for its execution by a processor (not shown) of a processing unit 702 (PROC) of the application server. For example, the memory unit stores a set of rules defined by an on-demand software service operator, in order to redirect on-demand software execution requests. This memory unit may also store a loading condition of a set of virtualization servers managed by the control server. The control server moreover includes a communications unit 703 (COM) for applying communications, notably for receiving and sending back on-demand software execution requests, and for sending requests for copying or displacing image files, in accordance with various embodiments of a method according to the invention.

Of course, the present invention is not limited to the embodiments described; other alternatives and combinations of features are possible.

The present invention was described and illustrated in the present detailed description with reference to the appended figures. However, the present invention is not limited to the embodiments shown. Other alternatives and embodiments may be inferred and applied by the person skilled in the art upon reading the present description and the appended figures.

In the claims, the term <<include>> does not exclude other elements or other steps. The indefinite article <<one>> does not exclude the plural. A single processor or several other units may be used for applying the invention. The different features shown and/or claimed may advantageously be combined. Their presence in the description or in different dependent claims, actually does not exclude the possibility of combining them. The reference marks cannot be understood as limiting the scope of the invention.

The invention claimed is:

1. A method for providing an on-demand software execution service comprising the following steps:
   receiving, from at least one terminal, at least one request for executing at least one software package, by a virtual machine launched on a virtual machine launching server, from files of a set of image files for launching virtual machines, the set of image files comprising:
      a first sub-set including at least one first image file representing a first state of a virtual machine wherein an operating system is installed on this machine;
      a second sub-set including at least one second image file representing a set of operations for bringing the virtual machine from the first state, in which said operating system is installed on the machine, to a second state wherein a software package is installed on the machine;
      a third sub-set including at least one third image file representing a set of operations for bringing the virtual machine from the second state, in which said operating system and the software package are installed on the machine, to a third state wherein said software package is launched on the machine; and
      a fourth sub-set including at least a context image file, which links virtual elements simulated by the virtual machine to actual physical elements of the terminal corresponding to said virtual elements,
   selecting at least four image files from among each of the first, second, third, and fourth sub-sets in order to execute said at least one software package by launching a virtual machine, three image files among the at least four image files corresponding to said at least one software package and to an operating system associated with said at least one software package;
   selecting, from a set of servers for launching virtual machines, at least one server to which the request will be directed, according to a rule for distributing the execution load of virtual machines by the servers of said set of servers, one or more image files among the set of image files being shared between the set of servers;
   concatenating the content of the at least four image files; and
   executing a virtual machine in the selected server based on this concatenation.

2. The method according to claim 1, wherein said at least one selected server stores at least one image file of said set of image files for executing said at least one software package.

3. The method according to claim 1, further comprising a step for requesting storage at said at least one selected server, of at least one image file of said set of image files for executing said at least one software package.

4. The method according to claim 3, further comprising a step for determining a level of use of said at least one image file by virtual machines and wherein the storage request is carried out when said level of use is above a threshold.

5. The method according to claim 3, further comprising the following steps:
   determining an execution load of virtual machines of a first server storing said at least one image file for executing said at least one software package,
   selecting said first server if the determined load meets a loading criterion and if the determined load does not meet the loading criterion,
   requesting storage of at least one image file at a second server and selecting said second server for executing said at least one software package.

6. The method according to claim 5, wherein the storage request is a request for displacing said at least one image file for executing said at least one software package, from the first server to the second server.

7. The method according to claim 5, wherein said at least one image file for executing said at least one software package is copied from the first server to the second server.

8. The method according to claim 1, further comprising the following steps:
   determining a number of instances of execution of a same software package on a third server from a set of terminals localized in a same geographic area,
   comparing this number of execution instances with a threshold, and if this number of instances is above this threshold:
   transferring the execution of said instances to a fourth server more closely located to said same geographic area than the third server, and selecting said fourth server for transferring the requests for executing said same software package from terminals localized in said geographic area.

9. The method according to claim 1, wherein the distribution rule takes into account the available bandwidth of the servers storing the files for executing said software package.

10. The method according to claim 1, further comprising a step for analyzing the amount of requests for executing said software package by several terminals and wherein the server is selected according to said request amount.

11. A computer program stored on a non-transitory computer readable memory, comprising instructions for applying a method for providing an on-demand software execution service comprising the following steps:
receiving, from at least one terminal, at least one request for executing at least one software package, by a virtual machine launched on a virtual machine launching server from image files of a set of image files for launching virtual machines, the set of image files comprising:
 a first sub-set including at least one first image file representing a first state of a virtual machine wherein an operating system is installed on this machine;
 a second sub-set including at least one second image file representing a set of operations for bringing the virtual machine from the first state, in which said operating system is installed on the machine, to a second state wherein a software package is installed on the machine;
 a third sub-set including at least one third image file representing a set of operations for bringing the virtual machine from the second state, in which said operating system and said software package are installed on the machine, to a third state wherein the software package is launched on the machine; and
 a fourth sub-set including at least a context image file, which links virtual elements simulated by the virtual machine to actual physical elements of the terminal corresponding to said virtual elements;
 at least four image files from among each of the first, second, third, and fourth sub-sets being selected in order to execute said at least one software package by launching a virtual machine, three image files among the at least four image files corresponding to said at least one software package and to an operating system associated with said at least one software package;
selecting, from a set of servers for launching virtual machines, at least one server to which the request will be directed, according to a rule for distributing the execution load of virtual machines by the servers of said set of servers, when the computer program is executed by a processor of a server for controlling a method for providing an on-demand software execution service, one or more image files among the set of image files being shared between the set of servers;
concatenating the content of the at least four image files; and
executing a virtual machine in the selected server, based on this concatenation.

12. A server that controls a method for providing an on-demand software execution service, the server comprising:
a communications unit that receives from at least one terminal, at least one request for executing at least one software package by a virtual machine launched on a virtual machine launching server from image files of a set of image files for launching virtual machines, the set of image files comprising:
 a first sub-set including at least one first image file representing a first state of a virtual machine wherein an operating system is installed on this machine;
 a second sub-set including at least one second image file representing a set of operations for bringing the virtual machine from the first state, in which said operating system is installed on the machine, to a second state wherein a software package is installed on the machine;
 a third sub-set including at least one third image file representing a set of operations for bringing the virtual machine from the second state, in which said operating system and said software package are installed on the machine, to a third state wherein the software package is launched on the machine; and
 a fourth sub-set including at least a context image file, which links virtual elements simulated by the virtual machine to actual physical elements of the terminal corresponding to said virtual elements;
wherein at least four image files from among each of the first, seconds, third, and fourth sub-sets are selected in order to execute said at least one software package by launching a virtual machine, said at least three image files corresponding to said at least one software package and to an operating system associated with said at least one software package; and
a processing unit that:
 selects from a set of virtual machine launching servers, at least one server to which the requests will be directed, according to a rule for distributing the execution load of virtual machines by servers of said set of servers; and
 shares one or more image files among the set of image files between the set of servers.

13. A system for providing an on-demand software execution service comprising:
a control server, executing a first processor, that controls a method for providing an on-demand software execution service comprising:
 a communications unit that receives from at least one terminal, at least one request for executing at least one software package by a virtual machine launched on a virtual machine launching server from image files of a set of image files for launching virtual machines, the set of image files comprising:
  a first sub-set including at least one first image file representing a first state of a virtual machine wherein an operating system is installed on this machine;
  a second sub-set including at least one second image file representing a set of operations for bringing the virtual machine from the first state, in which said operating system is installed on the machine, to a second state wherein a software package is installed on the machine;
  a third sub-set including at least one third image file representing a set of operations for bringing the virtual machine from the second state, in which said operating system and said software package are installed on the machine, to a third state wherein the software package is launched on the machine; and
  a fourth sub-set including at least a context image file, which links virtual elements simulated by the virtual machine to actual physical elements of the terminal corresponding to said virtual elements;

wherein at least four image files from among each of the first, second, third, and fourth sub-sets are selected in order to execute said at least one software package by launching a virtual machine, three image files among the at least four image files corresponding to said at least one software package and to an operating system associated with said at least one software package; a processing unit that:

selects from a set of virtual machine launching servers, at least one server to which the requests will be directed, according to a rule for distributing the execution load of virtual machines by servers of said set of servers; and shares one or more image files among the set of image files between the set of servers; and at least one virtual machine launching server that launches virtual machines from the concatenation of the content of the at least four image files of the set of image files.

14. The system according to claim 13, wherein said at least one virtual machine launching server includes a memory unit for storing said set of image files.

* * * * *